(12) United States Patent
Groom et al.

(10) Patent No.: US 12,355,352 B2
(45) Date of Patent: Jul. 8, 2025

(54) SWITCHING VOLTAGE REGULATOR WITH BI-POLAR LOAD REGULATION

(71) Applicant: Apple Inc., Cupertino, CA (US)

(72) Inventors: Terry J. Groom, Rio Vista, TX (US); Daibashish Gangopadhyay, San Jose, CA (US)

(73) Assignee: APPLE INC., Cupertino, CA (US)

( * ) Notice: Subject to any disclaimer, the term of this patent is extended or adjusted under 35 U.S.C. 154(b) by 415 days.

(21) Appl. No.: 17/887,095

(22) Filed: Aug. 12, 2022

(65) Prior Publication Data

US 2024/0055987 A1 Feb. 15, 2024

(51) Int. Cl.
*H02M 3/158* (2006.01)

(52) U.S. Cl.
CPC .................................. *H02M 3/158* (2013.01)

(58) Field of Classification Search
CPC ...................................................... H02M 3/158
See application file for complete search history.

(56) References Cited

U.S. PATENT DOCUMENTS

| | | | | |
|---|---|---|---|---|
| 6,809,504 B2 * | 10/2004 | Tang | .................... | G06F 1/305 363/16 |
| 7,183,756 B1 * | 2/2007 | Dikken | .............. | G01R 19/0092 323/280 |
| 8,222,879 B2 * | 7/2012 | Nguyen | .............. | H02M 3/1588 323/285 |
| 9,239,584 B2 | 1/2016 | Lemer et al. | | |
| 10,038,378 B2 | 7/2018 | Price et al. | | |
| 2014/0266113 A1 * | 9/2014 | Zuniga | .................. | H02M 1/088 323/282 |
| 2017/0364111 A1 | 12/2017 | Flaibani et al. | | |
| 2023/0353049 A1 * | 11/2023 | Zhang | .................... | H02M 1/32 |

* cited by examiner

*Primary Examiner* — Rafael O De Leon Domenech

(74) *Attorney, Agent, or Firm* — Sterne, Kessler, Goldstein & Fox P.L.L.C.

(57) ABSTRACT

The present disclosure describes a system with a voltage regulator, a current source circuit, and a control circuit. The voltage regulator has an output node and is configured to provide a supply voltage at the output node. The current source circuit is configured to draw current away from the voltage regulator's output node. And, the control circuit is configured to delay enabling the current source circuit in response to a voltage at the voltage regulator's output node being above a predetermined voltage level and the voltage regulator being disabled. With this arrangement, a voltage ripple at the voltage regulator's output node can be reduced in the presence of a bi-polar load current, which can be advantageous in voltage regulator designs (e.g., in DC-DC converters employing a Pulse Frequency Modulation scheme).

20 Claims, 9 Drawing Sheets

SWITCHING VOLTAGE REGULATOR WITH BI-POLAR LOAD REGULATION

FIELD

This disclosure relates to a voltage regulator and, more particularly, to a voltage regulator with load regulation.

BACKGROUND

Voltage regulators generate a stable output voltage within a range compatible with electronic circuits electrically connected to them. A type of voltage regulator is a DC-to-DC (DC-DC) converter, which converts a source of direct current (DC), such as a battery, from one voltage level to another. There are two types of DC-DC converters: linear and switched. A linear DC-DC converter uses a linear circuit element, such as a resistor, to regulate an output load. A switched DC-DC converter uses a switching circuit element, such as a switching transistor, to provide a pulsed voltage output to the output load. The pulsed voltage output can be smoothed using capacitors, inductors, and other circuit elements.

SUMMARY

Embodiments of the present disclosure include a system having a voltage regulator, a current source circuit, and a control circuit. The voltage regulator includes an output node and is configured to provide a supply voltage at the output node. The current source circuit is configured to draw current away from the output node. And, the control circuit is configured to detect a status of the voltage regulator, detect an output voltage at the output node, and adjust the current source circuit based on the detected status of the voltage regulator and the detected output at the output node.

Embodiments of the present disclosure include a power supply system having a switched DC-DC converter, a load circuit, a negative current regulator, and a control circuit. The switched DC-DC converter includes an output node and is configured to provide a power supply voltage at the output node. The load circuit is electrically connected to the output node. The negative current regulator is configured to draw current away from the output node. And, the control circuit is configured to delay enabling the negative current regulator in response to the switched DC-DC converter being disabled and a voltage at the output node being above a predetermined voltage level. The delayed enablement of the negative current regulator occurs after the power supply voltage reaches a maximum voltage level.

Embodiments of the present disclosure include a method for regulating an output load of a voltage regulator. The method includes generating a supply voltage at the output node of the voltage regulator. The method also includes monitoring when the voltage regulator is disabled and a voltage at the output node is above a predetermined voltage level. The method also includes delaying enablement of a current source circuit in response to the voltage regulator being disabled and the voltage at the output node being above the predetermined voltage level. The method further includes drawing, with the current source circuit, current away from the output node in response to the current source circuit being enabled.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

Illustrative embodiments will now be described with reference to the accompanying drawings. In the drawings, like reference numerals generally indicate identical, functionally similar, and/or structurally similar elements.

DETAILED DESCRIPTION

Figure 1:
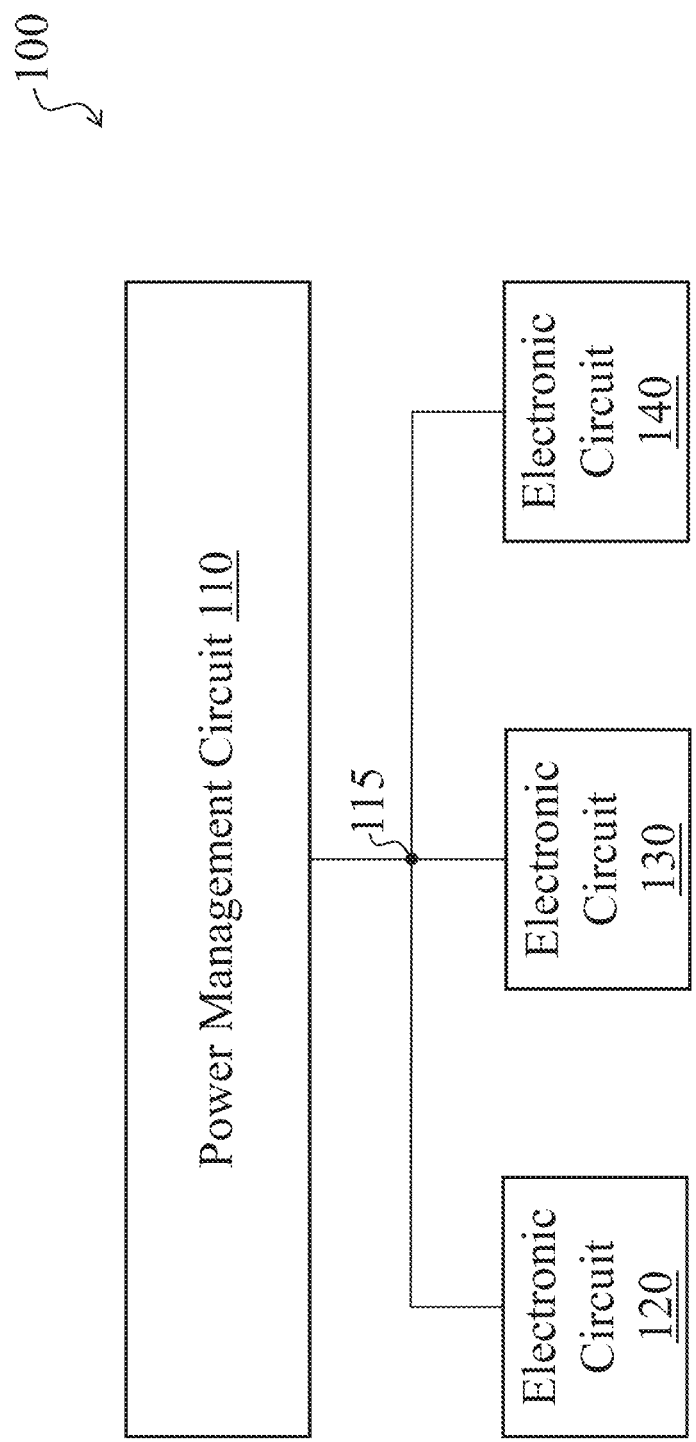
FIG. 1 is an illustration of an electronic system, according to some embodiments.

The following disclosure provides many different embodiments, or examples, for implementing different features of the provided subject matter. Specific examples of components and arrangements are described below to simplify the present disclosure. These are merely examples and are not intended to be limiting. In addition, the present disclosure repeats reference numerals and/or letters in the various examples. This repetition is for the purpose of simplicity and clarity and, unless indicated otherwise, does not in itself dictate a relationship between the various embodiments and/or configurations discussed.

It is noted that references in the specification to "one embodiment," "an embodiment," "an example embodiment," "exemplary," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

In some embodiments, the terms "about" and "substantially" can indicate a value of a given quantity that varies within 20% of the value (e.g., ±1%, ±2%, ±3%, ±4%, ±5%, ±10%, ±20% of the value). These values are merely examples and are not intended to be limiting. The terms "about" and "substantially" can refer to a percentage of the values as interpreted by those skilled in relevant art(s) in light of the teachings herein.

It is to be understood that the phraseology or terminology herein is for the purpose of description and not of limitation, such that the terminology or phraseology of the present specification is to be interpreted by those skilled in relevant art(s) in light of the teachings herein.

The following disclosure describes aspects of a voltage regulator, such as a switched DC-DC converter, with load regulation. Specifically, the present disclosure describes a voltage regulator configured to provide a supply voltage (e.g., a power supply voltage), a current source circuit configured to draw current away from an output node of the voltage regulator, and a control circuit configured to delay enabling of the current source circuit. The delayed enablement of the current source circuit is set by the control circuit based on voltage at the voltage regulator's output node being above a predetermined voltage level (e.g., a shunt-to-ground threshold voltage level) and the voltage regulator being disabled (or set in a high-Z state). By delaying the enablement of the current source circuit, voltage regulator performance can be improved. For example, the enablement of the current source circuit can be delayed until after the voltage regulator fully transfers charge to the output load, thus improving power conversion efficiency. Also, by enabling the current source circuit after the voltage regulator has been disabled (or set in a high-Z state), the predetermined voltage level can be set below a maximum ripple voltage of the supply voltage, thus reducing or mitigating an undesirable DC offset at the voltage regulator's output node when an output load electrically connected to the voltage regulator's output node transitions to a higher voltage level, causing current to flow into the voltage regulator's output node (e.g., a load polarity change).

FIG. 1 is an illustration of an electronic system 100, according to some embodiments. Electronic system 100 includes a power management circuit 110 and electronic circuits 120, 130, and 140. Power management circuit 110 can convert a source of incoming power (e.g., a battery or other suitable power supply source) to desired voltage/current characteristics of electronic circuits 120, 130, and 140. In some embodiments, power management circuit 110 provides a supply voltage 115 (e.g., a power supply voltage 115) to electronic circuits 120, 130, and 140 and regulates supply voltage 115 as electronic circuits 120, 130, and 140 vary in voltage and/or current consumption (also referred to herein as a "load"). Supply voltage 115 can be at any suitable voltage level for electronic circuits 120, 130, and 140, such as 1.0 V, 1.2 V, 1.8 V, 2.4 V, 3.3 V, and 5.0 V. Though electronic system 100 shows power management circuit 110 with a single supply voltage 115 electrically connected to electronic circuits 120, 130, and 140, electronic system 100 is not limited to such circuit architecture. For example, power management circuit 110 can provide different supply voltages to one or more of electronic circuits 120, 130, and 140. These other circuit architectures are within the scope of the present disclosure.

Electronic circuits 120, 130, and 140 can be any suitable type of electronic device, such as a processor circuit, a memory circuit, an input/output (I/O) circuit, a peripheral circuit, and combinations thereof. In some embodiments, the processor circuit can include a general-purpose processor to perform computational operations, such as a central processing unit. The processor circuit can also include other types of processing units, such as a graphics processing unit, an application-specific circuit, and a field-programmable gate array circuit. In some embodiments, the memory circuit can include any suitable type of memory, such as Dynamic Random Access Memory, Static Random Access Memory, Read-Only Memory, Electrically Programmable Read-Only Memory, non-volatile memory, and combinations thereof.

In some embodiments, the I/O circuit can coordinate data transfer between one of electronic circuits 120, 130, and 140 (e.g., a processor circuit) and a peripheral circuit. The I/O circuit can implement a version of Universal Serial Bus protocol or IEEE 1394 (Firewire®) protocol, according to some embodiments. Further, in some embodiments, the I/O circuit can perform data processing to implement networking standards, such as an Ethernet (IEEE 802.3) networking standard. Examples of the peripheral circuit can include storage devices (e.g., magnetic or optical media-based storage devices, including hard drives, tape drives, CD drives, DVD drives, and any suitable storage device), audio processing systems, and any suitable type of peripheral circuit, according to some embodiments.

Figure 2:
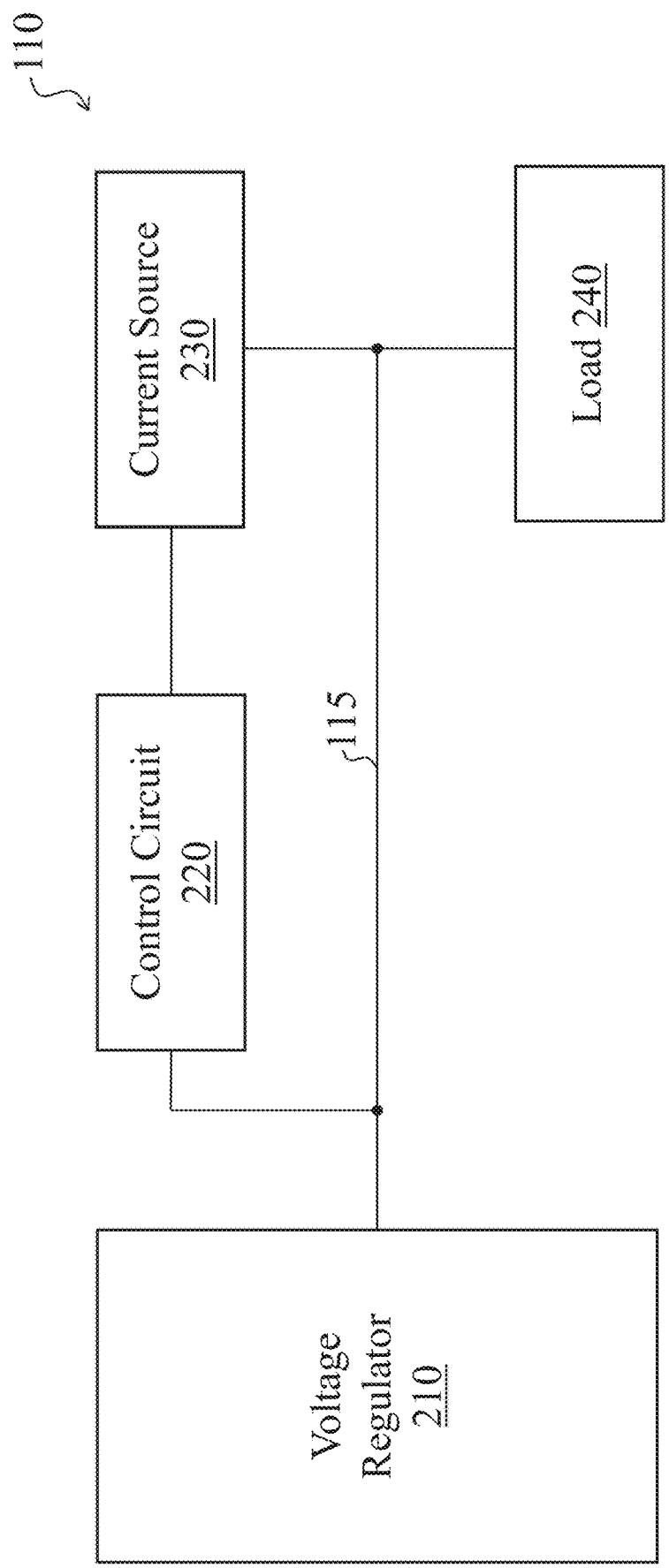
FIG. 2 is an illustration of a block-level representation of a power management circuit, according to some embodiments.

FIG. 2 is an illustration of a block-level representation of a power management circuit 110, according to some embodiments. Power management circuit 110 includes a voltage regulator 210, a control circuit 220, a current source circuit 230, and a load circuit 240, according to some embodiments.

Voltage regulator 210 provides supply voltage 115 at an output node. In some embodiments, voltage regulator 210 can be a switched DC-DC voltage converter, such as a step-up voltage converter (e.g., a boost voltage converter), a step-down voltage converter (e.g., a buck voltage converter), or a step down/up voltage converter (e.g., a buck-boost voltage converter). The switched DC-DC converter can employ a pulse frequency modulation (PFM) mode of operation, where a switching frequency of the switched DC-DC voltage converter can change as a function of a current consumed by load circuit 240 (e.g., positive or negative load current). The PFM mode of operation can be asynchronous, in which switched DC-DC converter pulses are generated when a voltage level of supply voltage 115 falls below a desired output voltage of the switched DC-DC converter. As a result, switching losses in the switched DC-DC converter can be reduced, thus improving the converter's power conversion efficiency for positive and negative load currents (e.g., bi-polar load current).

In some embodiments, supply voltage 115 can be a power supply voltage to load circuit 240. The voltage level of supply voltage 115 can be at any suitable voltage level for load circuit 240, such as 1.0 V, 1.2 V, 1.8 V, 2.4 V, 3.3 V, and 5.0 V. Due to the switching characteristics of the switched DC-DC voltage converter and parasitic effects of load circuit 240, a voltage ripple can appear on supply voltage 115, in which supply voltage 115 can rise to a maximum voltage level and fall to a minimum voltage level. The parasitic effects can be associated with capacitive characteristics associated with load circuit 240, such as equivalent series resistance (ESR) and equivalent series inductance (ESL) impedance characteristics of load circuit 240. For example, the maximum and minimum voltage levels of supply voltage 115 can be ±5%, ±10%, ±15%, and ±20%— or any other suitable voltage percentage—of the desired output voltage of the switched DC-DC converter.

Referring to FIG. 2, control circuit 220 can be configured to delay enabling current source circuit 230, according to some embodiments. The delay in enabling current source circuit 230 can be based on two criteria: (1) voltage regulator 210 being disabled or set in a high-Z state (e.g., switched DC-DC converter pulses are not generated); and (2) a voltage at the output node of voltage regulator 210 being above a predetermined voltage level (e.g., a shunt-to-ground threshold voltage, as described below). In some embodiments, if both criteria are met, control circuit 220 transmits a delayed enable signal to current source circuit 230. As described in further detail below, in some embodiments, the delayed enable signal can be transmitted to current source circuit 230 until a period of time after supply voltage 115 reaches its maximum voltage level. As a result, voltage regulator 210 can fully transfer charge to load circuit 240, thus improving power conversion efficiency.

Current source circuit 230 can be configured to draw current away from the output node of voltage regulator 210, according to some embodiments. Due to its operation to draw current away from the output node of voltage regulator 210, current source circuit 230 is also referred to herein as a "negative current regulator." In some embodiments, current source circuit 230 can include a low dropout linear regulator to draw current away from the output node of voltage regulator 210. In some embodiments, current source circuit 230 can be configured to draw current away from the output node of voltage regulator 210 upon receiving a delayed enable signal from control circuit 220.

Load circuit 240 represents one or more of electronic circuits 120, 130, and 140 of FIG. 1. As discussed above, electronic circuits 120, 130, and 140 can vary in load. In some embodiments, voltage regulator 210 can electrically connect to one or more of electronic circuits 120, 130, and 140 at different times—which can depend on, for example, operation(s) being performed by electronic system 100 of FIG. 1. Because electronic circuits 120, 130, and 140 can vary in load and voltage regulator 210 can electrically connect to one or more of these circuits at different times, load circuit 240 can transition to different voltage levels. For example, load circuit 240 can transition from requiring a first supply voltage to a second supply voltage, where the second supply voltage is lower than the first supply voltage. As a result of the voltage transition, current flows away from load circuit 240 and into the output node of voltage regulator 210, which can cause an undesirable DC offset and a resulting inaccuracy at the voltage regulator's output node. This voltage transition at the output node of voltage regulator 210 is also referred to herein as a "load polarity change." If the load polarity change occurs periodically, the voltage ripple at the output node of voltage regulator 210 can increase, thus increasing inaccuracies at the voltage regulator's output node.

Embodiments of the present disclosure address, among other things, the undesirable effects due to a load polarity change at the output node of voltage regulator 210. To reduce the DC offset from the load polarity change, embodiments of the present disclosure set a predetermined voltage level at which current source circuit 230 is enabled below a maximum voltage level of supply voltage 115. Further, embodiments of the present disclosure delay enablement of current source circuit 230 until after voltage regulator 210 fully transfers charge to load circuit 240, thus improving the voltage regulator's power conversion efficiency.

Figure 3:
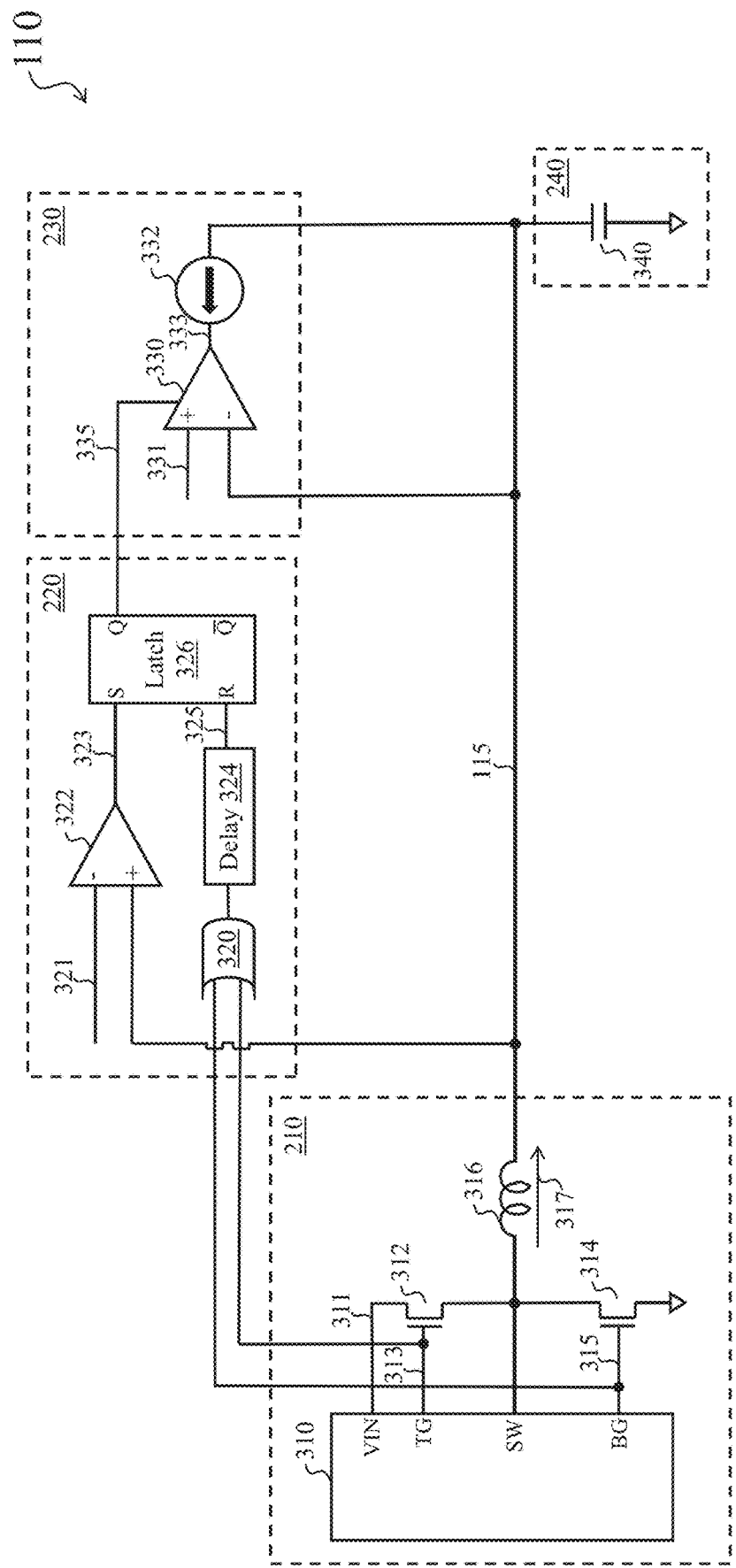
FIG. 3 is an illustration of a circuit-level representation of a power management circuit, according to some embodiments.

FIG. 3 is an illustration of a circuit-level representation of power management circuit 110, according to some embodiments. Voltage regulator 210 is configured to provide a supply voltage at its output node (e.g., at supply voltage 115) and can have a step-down voltage converter architecture (e.g., a buck voltage converter architecture), according to some embodiments. Voltage regulator 210 includes a controller 310, a first transistor 312, a second transistor 314, and an inductor 316. In some embodiments, controller 310 provides pulses to first transistor 312 and second transistor 314 according to a PFM mode of operation. For example, in the PFM mode of operation, controller 310 can provide pulses to turn on and off first transistor 312 and second transistor 314 at variable times—via a signal line 313 and a signal line 315 electrically connected to a gate terminal of first transistor 312 and a gate terminal of second transistor 314, respectively-based on the load required by load circuit 240. As the load requirement increases, controller 310 can turn on and off first transistor 312 and second transistor 314 (also referred to herein as "switching frequency") at an increased frequency to pass a voltage from a power supply source (e.g., a battery or other suitable power supply source) via a signal line 311 to an inductor 316, which in turn provides a current 317 to load circuit 240. Conversely, as the load requirement decreases, controller 310 decreases the switching frequency of first transistor 312 and second transistor 314. In some embodiments, first transistor 312 and second transistor 314 can be n-type transistors, p-type transistors, or a combination thereof. Further, in some embodiments, first transistor 312 and second transistor 314 can be metal-oxide-semiconductor (MOS) transistors, such metal-oxide semiconductor field-effect transistors (MOSFETs), fin field-effect transistors (FinFETs), gate-all-around field-effect transistors (GAAFETs), gallium nitride field effect transistors (GaNFETs), or any other suitable type of transistors.

Controller 310 can include a comparator circuit (not shown in FIG. 3) to assist in regulating a desired output voltage of voltage regulator 210 at supply voltage 115. In some embodiments, the comparator circuit can compare the voltage level of supply voltage 115 (e.g., in which controller 310 can receive a feedback signal electrically connected to supply voltage 115)—or a voltage level representative of supply voltage 115—to a voltage regulator reference voltage. If the voltage at supply voltage 115 (or voltage level representative of supply voltage 115) is below the voltage regulator reference voltage—e.g., load circuit 240 draws current away from supply voltage 115—voltage regulator 210 can be enabled and controller 310 can adjust the switching frequency to turn on and off first transistor 312 and second transistor 314 to increase the voltage level of supply voltage 115 to or above the desired output voltage of voltage regulator 210, according to some embodiments. After supply voltage 115 reaches the desired output voltage of voltage regulator 210, voltage regulator 210 can be disabled (or set in a high-Z state)—e.g., no pulses are received by first transistor 312 and second transistor 314—until supply voltage 115 falls below the desired output voltage of voltage regulator 210. When voltage regulator 210 is disabled, the gate terminal of first transistor 312 (signal line 313) can be electrically connected to an output terminal SW of controller 310 (which is at ground or 0 V when voltage regulator 210 is disabled) and the gate terminal of second transistor 314 (signal line 315) can be electrically connected to ground. When disabled, voltage regulator 210 is in a high-Z state until supply voltage 115 falls below the desired output voltage of voltage regulator 210. And, when this supply voltage 115 condition occurs, voltage regulator 210 is enabled and provides pulses to first transistor 312 and second transistor 314 to raise the voltage level of supply voltage 115.

Referring to FIG. 3, control circuit 220 is configured to delay an enablement of current source circuit 230 in response to voltage regulator 210 being disabled (or set in a high-Z state) and the voltage regulator's output node voltage being above a predetermined voltage level, according to some embodiments. In some embodiments, control circuit 220 includes a logic OR circuit 320, a comparator circuit 322, a delay circuit 324, and a latch circuit 326. Inputs of logic OR circuit 320 are electrically connected to the gate terminals of first transistor 312 and second transistor 314 via signal line 313 and signal line 315, respectively. When voltage regulator 210 is disabled (or set in a high-Z state)—e.g., no pulses are received by first transistor 312 and second transistor—the gate terminals of first transistor 312 and second transistor 314 can each be at a logic low value (e.g., 0 V or ground). Logic OR circuit 320 receives the logic low inputs and outputs a logic low value into delay circuit 324. Other types of circuits and combinations thereof can also be used to implement the desired logic function of logic OR circuit 320.

Delay circuit 324 is configured to provide a delayed version of the output from logic OR circuit 320 to latch circuit 326, according to some embodiments. In some embodiments, delay circuit 324 is configured to delay the output from logic OR circuit 320 for a predetermined amount of time from when voltage regulator 210 is disabled or set in a high-Z state (e.g., a time period between time $t_6$ to time $t_8$, as discussed below with respect to FIG. 4). For example, the predetermined amount of time can be a time period from when voltage regulator 210 is disabled (or set in a high-Z state) to when voltage regulator 210 fully transfers charge to load circuit 240 (e.g., time period time $t_4$ to time $t_6$, as discussed below with respect to FIG. 4). Delay circuit 324 can include a chain of inverter circuits to implement a propagation delay associated with the predetermined amount of time. Other types of circuits and combinations thereof can also be used to implement the propagation delay. Delay circuit 324 provides the delayed version of the output from logic OR circuit 320 to latch circuit 326 as an input signal 325.

Comparator circuit 322 provides another input signal 323 to latch circuit 326 based on a comparison of supply voltage 115 to a control circuit reference voltage 321. In some embodiments, if the voltage level of supply voltage 115 is above control circuit reference voltage 321, comparator circuit 322 outputs a logic high value (e.g., a power supply voltage, such as 1.0 V, 1.2 V, 1.8 V, 2.4 V, 3.3 V, and 5.0 V) for input signal 323. Conversely, if the voltage level of supply voltage 115 is below control circuit reference voltage 321, comparator circuit 322 outputs a logic low value for input signal 323. In some embodiments, control circuit reference voltage 321 can be set at or about the voltage regulator reference voltage (discussed above with respect to controller 310).

Latch circuit 326 receives input signals 323 and 325. In some embodiments, latch circuit 326 can be an SR latch, where input signal 323 is received by an S-input of the latch and input signal 325 is received by an R-input of the latch. When the S-input is at a logic high value and the R-input is at a logic low value, a Q-output of the latch—e.g., a comparator circuit enable signal 335—is at a logic high value. When the S-input is at a logic high value and the R-input is at a logic high value, the Q-output of the latch is at a logic low value. In some embodiments, when supply voltage 115 is above the voltage regulator reference voltage (e.g., the S-input is at a logic high value) and voltage regulator 210 is disabled or set in a high-Z state (e.g., the R-input is at a logic low value), comparator circuit enable signal 335 is at a logic high value.

Referring to FIG. 3, current source circuit 230 is configured to draw current away from supply voltage 115 when voltage regulator 210 is disabled (or set in a high-Z state) and when supply voltage 115 is above a predetermined voltage level. Current source circuit 230 includes a comparator circuit 330 and a current source 332.

Comparator circuit 330 provides a current source enable signal 333 to current source 332. In some embodiments, comparator circuit 330 receives three inputs: comparator circuit enable signal 335, a current source reference voltage 331, and supply voltage 115. In some embodiments, current source reference voltage 331 can be associated with a maximum voltage level that supply voltage 115 can reach when voltage regulator 210 is disabled (or set in a high-Z state). For example, when voltage regulator 210 is disabled, the voltage level of supply voltage 115 can either rise or fall depending on the current drawn by load circuit 240. If load circuit 240 draws current from supply voltage 115 (e.g., to support a higher voltage level or a positive output load for load circuit 240), then the voltage level of supply voltage 115 can fall. Conversely, if load circuit 240 sinks current into supply voltage 115 (e.g., to support a lower voltage level or a negative output load for load circuit 240), then the voltage level of supply voltage 115 can rise. The current sunk into supply voltage 115 is also referred to herein as a "negative load current," which can cause an undesirable DC offset at supply voltage 115. To reduce or mitigate the DC offset when a negative output load is present, current source circuit 230 can be enabled to sink the negative load current to ground.

Current source reference voltage 331 can be set at or about the voltage level of supply voltage 115 when current source circuit 230 is enabled. This voltage level is also referred to herein as a "shunt-to-ground (S2G) threshold voltage level." In some embodiments, the S2G threshold voltage level can be set at a voltage level below the maximum ripple voltage of supply voltage 115 when voltage regulator 210 is enabled. By setting the S2G threshold voltage level below the maximum ripple voltage of supply voltage 115, an undesirable DC offset can be further reduced or mitigated at supply voltage 115 when a load polarity change occurs (e.g., a transition from a positive output load to a negative output load that injects negative load current into supply voltage 115).

As discussed above, when supply voltage 115 is above the voltage regulator reference voltage and voltage regulator 210 is disabled (or set in a high-Z state), comparator circuit enable signal 335 is at a logic high value. In some embodiments, when comparator circuit enable signal 335 is at a logic high value, comparator circuit 330 is enabled. Conversely, when comparator circuit enable signal 335 is at a logic low value, comparator circuit 330 is disabled.

When comparator circuit 330 is enabled, if the voltage level of supply voltage 115 is above current source reference voltage 331 (e.g., the S2G threshold voltage level), comparator circuit 330 outputs a logic high value for current source enable signal 333. When current source enable signal 333 is at a logic high value, current source 332 is enabled and draws current away from the output node of voltage regulator 210, thus preventing supply voltage 115 to rise above current source reference voltage 331. In some embodiments, comparator circuit 330 measures a voltage level magnitude difference between supply voltage 115 and current source reference voltage 331. Based on the voltage level magnitude difference, comparator circuit 330 adjusts a current level of current source 332. For example, when supply voltage 115 is above current source reference voltage 331, a higher supply voltage 115 results in a higher voltage level magnitude difference between supply voltage 115 and current source reference voltage 331. This voltage level magnitude difference can be provided to current source 332 via current source enable signal 333. Based on current source enable signal 333, current source 332 can adjust the current drawn away from the output node of voltage regulator 210—e.g., a higher voltage level magnitude difference results in current source enable signal 333 indicating a higher current level from current source 332. If the voltage level of supply voltage 115 is below current source reference voltage 331, comparator circuit 330 outputs a logic low value for current source enable signal 333, thus disabling current source 332.

Referring to FIG. 3, load circuit 240 is represented by a capacitor 340. Capacitor 340 can represent the capacitance of one or more of electronic circuits 120, 130, and 140 electrically connected to voltage regulator 210.

Figure 4:
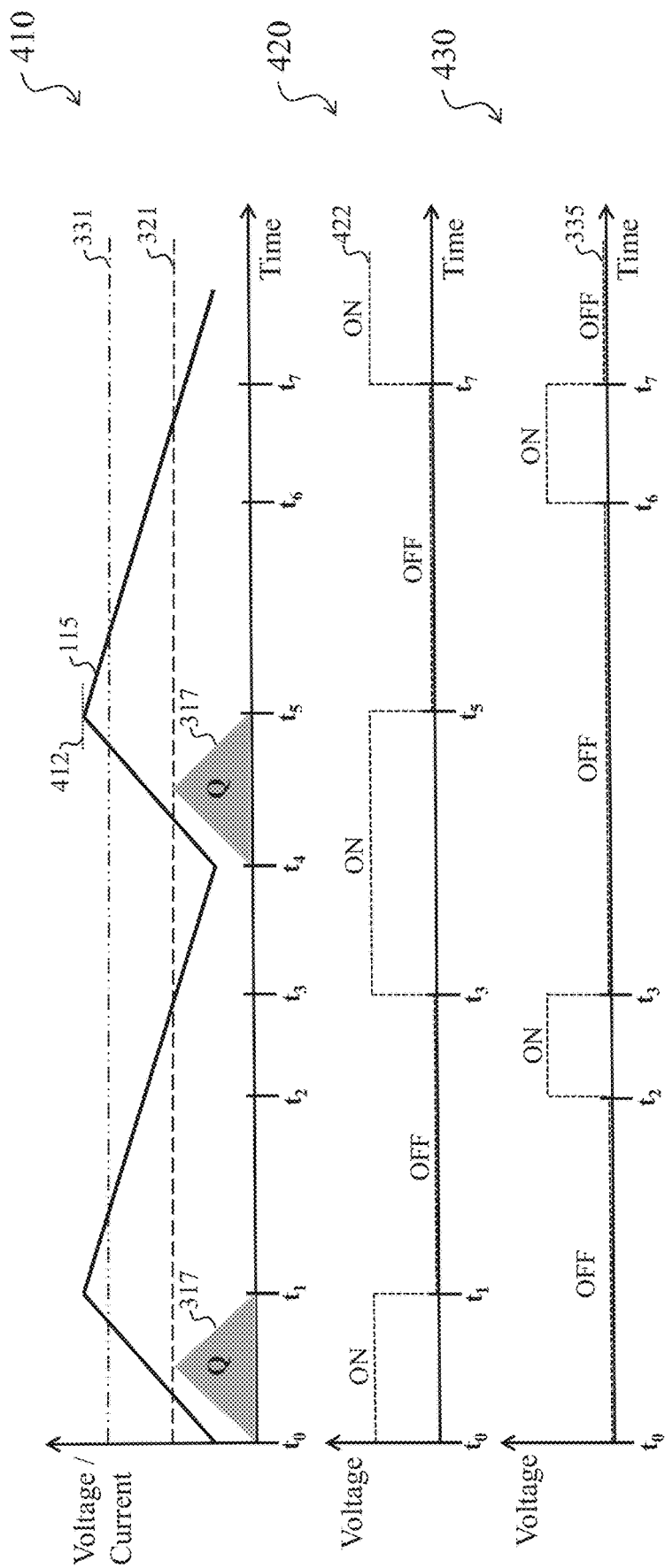
FIG. 4 is an illustration of waveforms showing an operation of the power management circuit of FIG. 3 with a positive output load, according to some embodiments.

FIG. 4 is an illustration of waveforms 410, 420, and 430 showing an operation of the power management circuit of FIG. 3 with a positive output load, according to some embodiments. Waveform 410 shows an example behavior of supply voltage 115 over time and an example behavior of current 317 (i.e., current flowing through inductor 316 of voltage regulator 210) over time. Waveform 420 shows an example behavior of an output from a comparator circuit output in controller 310 over time. The comparator circuit in controller 310 (not shown in FIG. 3) compares the voltage level of supply voltage 115—or a voltage level representative of supply voltage 115—to a voltage regulator reference voltage and provides a comparator circuit output 422. In some embodiments, when comparator circuit output 422 is a logic high value, voltage regulator 210 can be enabled and controller 310 can adjust the switching frequency to turn on and off first transistor 312 and second transistor 314 to increase the voltage level of supply voltage 115 to or above the desired output voltage of voltage regulator 210. When comparator circuit output 422 is a logic low value, voltage regulator 210 can be disabled (or set in a high-Z state)—e.g., no pulses are received by first transistor 312 and second transistor 314. And waveform 430 shows an example behavior of comparator circuit enable signal 335 over time. The curvatures in waveforms 410, 420, and 430 are exemplary and for illustration purposes; these waveforms may include different curvatures.

Waveform 410 includes control circuit reference voltage 321 and current source reference voltage 331. As discussed above, in some embodiments, control circuit reference voltage 321 and current source reference voltage 331 can be set to the voltage regulator reference voltage and the S2G threshold voltage level, respectively. As shown in waveform 410, current source reference voltage 331 (e.g., the S2G threshold voltage level) is below the maximum ripple voltage 412 of supply voltage 115. During the operation of voltage regulator 210, when supply voltage 115 falls below control circuit reference voltage 321 (e.g., the voltage regulator reference voltage)—e.g., due to current drawn by load circuit 240 of FIG. 3—comparator circuit output 422 is at a logic high value.

Referring to waveform 420, comparator circuit output 422 is at a logic high value during the following time periods: time period time $t_0$ to time $t_1$; time period time $t_3$ to time $t_5$; and at time $t_7$. In some embodiments, comparator circuit output 422 can transition from a logic low value to a logic high value when supply voltage 115 initially falls below control circuit reference voltage 321 (e.g., the voltage regulator reference voltage) and remain at the logic high value for a predetermined amount of time. For example, at time $t_3$, comparator circuit output 422 transitions from a logic low value to a logic high value due to supply voltage 115 falling below control circuit reference voltage 321 and remains at a logic high value for a predetermined amount of time—e.g., a time period from time $t_3$ to time $t_5$. During this time period (e.g., time period time $t_3$ to time $t_5$), voltage regulator 210 is enabled, in which controller 310 adjusts the switching frequency to turn on and off first transistor 312 and second transistor 314 to increase the voltage level of supply voltage 115 to or above control circuit reference voltage 321. For example, at time $t_4$, controller 310 provides pulses to turn on and off first transistor 312 and second transistor 314 at variable times—via signal line 313 and signal line 315 electrically connected to gate terminals of first transistor 312 and second transistor 314, respectively-based on the load required by load circuit 240. Referring to waveform 410, current 317 (or charge Q) is fully transferred to load circuit 240 during time period time $t_4$ to time $t_5$, thus raising the voltage level of supply voltage 115 above control circuit reference voltage 321 (e.g., the voltage regulator reference voltage).

Referring to waveform 430, comparator circuit enable signal 335 transitions from a logic low value to a logic high value at a delayed time after comparator circuit output 422 transitions from a logic high value to a logic low value, according to some embodiments. When comparator circuit output 422 is at a logic low value, voltage regulator 210 is disabled (or set in a high-Z state). The time at which comparator circuit enable signal 335 transitions to a logic high value—and thus enabling comparator circuit 330—is a delayed time after which voltage regulator 210 is disabled (or set in a high-Z state).

For example, referring to waveforms 420 and 430, comparator circuit output 422 transitions from a logic high value to a logic low value at time $t_5$. At time $t_6$, comparator circuit enable signal 335 transitions from a logic low value to a logic high value. Thus, the delayed time at which comparator circuit enable signal 335 transitions to a logic high value is the time period between time is and time $t_6$. As shown in waveform 410, at time $t_6$, voltage regulator 210 has already fully transferred current 317 (or charge Q) to load circuit 240. Put differently, supply voltage 115 reaches its maximum ripple voltage (when voltage regulator 210 is enabled) prior to comparator circuit enable signal 335 transitioning to a logic high value. Referring to FIG. 3, delay circuit 324 can implement the desired delay time period (e.g., the delay time period between time is and time $t_6$).

At time $t_6$, once comparator circuit enable signal 335 is at a logic high value, comparator circuit 330 compares supply voltage 115 to current source reference voltage 331 (e.g., the S2G threshold voltage level). As discussed above, if the voltage level of supply voltage 115 is above current source reference voltage 331, comparator circuit 330 outputs a logic high value for current source enable signal 333. In some embodiments, comparator circuit 330 adjusts a current level of current source 332 (via current source enable signal 333) based on a voltage level magnitude difference between supply voltage 115 and current source reference voltage 331. In turn, current source 332 is enabled and draws current away from the output node of voltage regulator 210, thus preventing supply voltage 115 to rise above current source reference voltage 331. Conversely, if the voltage level of supply voltage 115 is below current source reference voltage 331, comparator circuit 330 outputs a logic low value for current source enable signal 333, thus disabling current source 332.

A benefit of delaying the enablement of comparator circuit 330, among others, is that voltage regulator 210 can fully transfer current 317 (or charge Q) to load circuit 240 prior to current source 332 being enabled. If the enablement of comparator circuit 330 is not delayed, current source 332 can be enabled when supply voltage 115 rises above current source reference voltage 331 (e.g., the S2G threshold voltage level) and before current 317 (or charge Q) is fully transferred, thus degrading the power conversion efficiency of voltage regulator 210.

Figure 5:
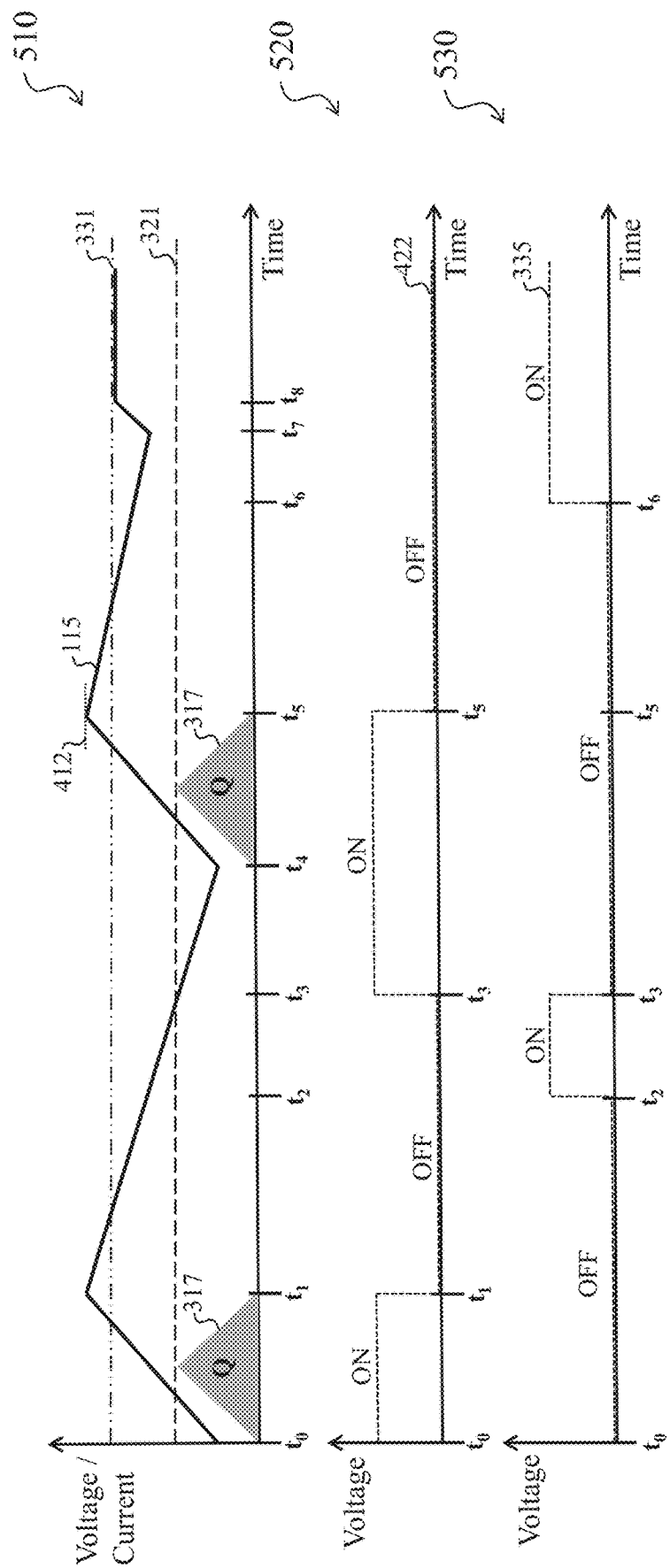
FIG. 5 is an illustration of waveforms showing an operation of the power management circuit of FIG. 3 transitioning from a positive output load to a negative output load, according to some embodiments.

FIG. 5 is an illustration of waveforms 510, 520, and 530 showing an operation of the power management circuit of FIG. 3 transitioning from a positive output load to a negative output load (e.g., a load polarity change), according to some embodiments. Waveform 510 shows an example behavior of supply voltage 115 over time and an example behavior of current 317 over time. Waveform 520 shows an example behavior of comparator circuit output 422 over time. And waveform 430 shows an example behavior of comparator circuit enable signal 335 over time. The curvatures in waveforms 510, 520, and 530 are exemplary and for illustration purposes; these waveforms may include different curvatures.

For the time period time $t_0$ to time $t_6$, the description of waveforms 510, 520, and 530 is similar to that of waveforms 410, 420, and 430 of FIG. 4. At time $t_7$, while voltage regulator 210 is disabled (or set in a high-Z state) and comparator circuit 330 is enabled, a load polarity change occurs where a negative load current sinks current into supply voltage 115, thus causing supply voltage 115 to rise. In some embodiments, when supply voltage 115 reaches current source reference voltage 331 (e.g., the S2G threshold voltage level) at time $t_8$, comparator circuit 330 outputs a logic high value for current source enable signal 333, which enables current source 332. As discussed above, in some embodiments, comparator circuit 330 can adjust a current level of current source 332 via current source enable signal 333. Current source 332 draws current away from supply voltage 115 to maintain the voltage level of supply voltage 115 at or below current source reference voltage 331 (e.g., the S2G threshold voltage level), according to some embodiments.

A benefit of delaying enablement of current source 332, among others, is that current source reference voltage 331 (e.g., the S2G threshold voltage level) can be set below a maximum ripple voltage 412 of supply voltage 115. If the load polarity change occurs periodically, the voltage ripple at the output node of voltage regulator 210 can increase, thus increasing inaccuracies at the voltage regulator's output node. Thus, by setting current source reference voltage 331 (e.g., the S2G threshold voltage level) below the maximum ripple voltage 412 of supply voltage 115, an undesirable DC offset at the output node voltage regulator 210 when undergoing a load polarity change can be reduced or mitigated.

Figure 6:
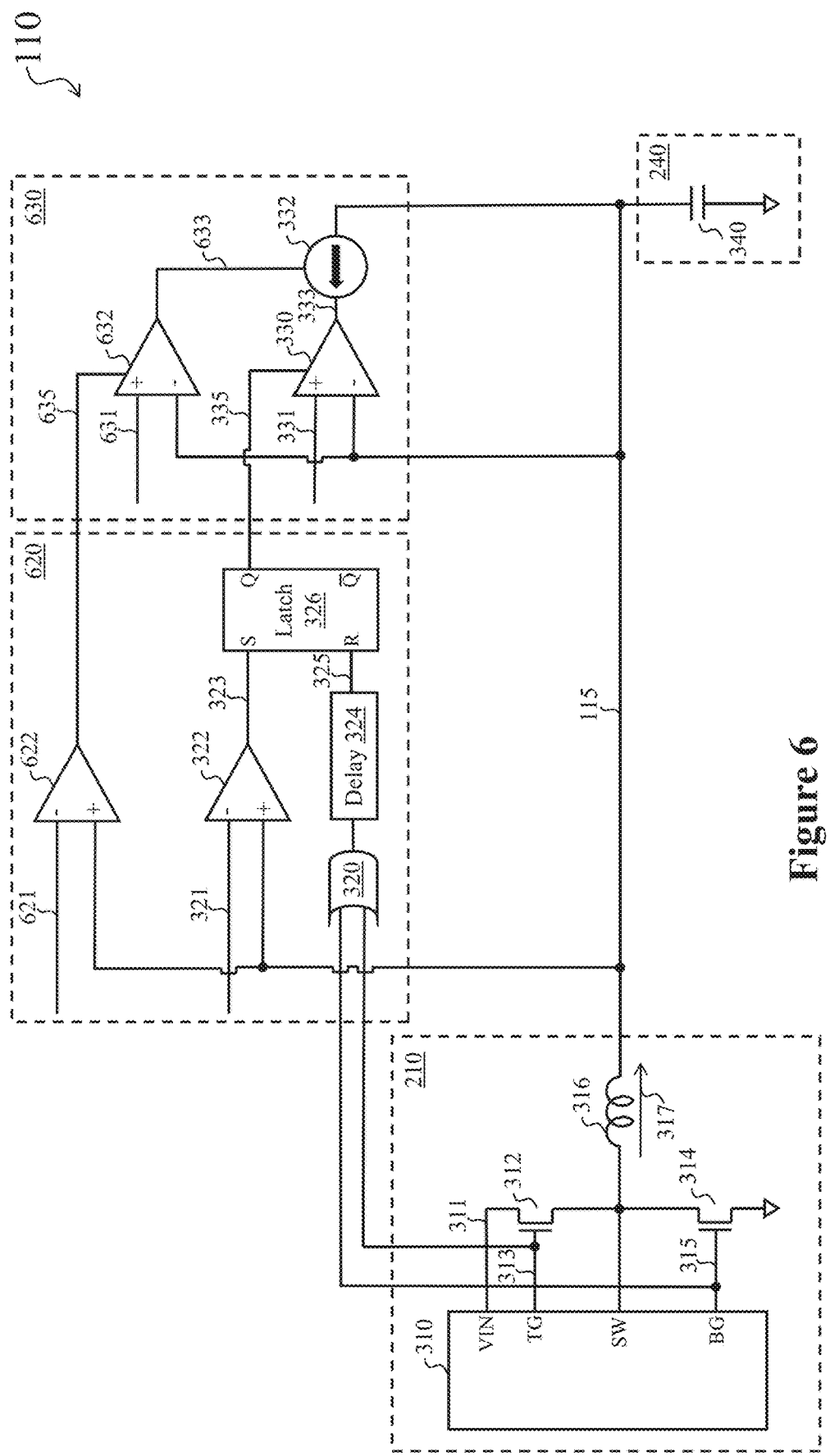
FIG. 6 is an illustration of another circuit-level representation of a power management circuit, according to some embodiments.

FIG. 6 is an illustration of another circuit-level representation of power management circuit 110, according to some embodiments. This circuit-level representation of power management circuit includes voltage regulator 210, a control circuit 620, a current source 630, and load circuit 240. Voltage regulator 210 and load circuit 240 are described above with respect to FIG. 3. Control circuit 620 includes logic OR circuit 320, comparator circuit 322, delay circuit 324, latch circuit 326, and comparator circuit 622. Current source 630 includes comparator circuit 330, current source 332, and a comparator circuit 632.

In some embodiments, control circuit 620 is configured to: (1) delay an enablement of current source circuit 630 in response to voltage regulator 210 being disabled (or set in a high-Z state) and the voltage regulator's output node voltage being above a first predetermined voltage level; and (2) enable current source circuit 630 in response to the voltage regulator's output node voltage being above a second predetermined voltage level. With respect to operation (1), logic OR circuit 320, comparator circuit 322, delay circuit 324, and latch circuit 326 operate in a similar manner as the same circuits in control circuit 220 of FIG. 3.

With respect to operation (2), comparator circuit 622 provides a comparator circuit enable signal 635 to comparator circuit 632 based on a comparison of supply voltage 115 to a control circuit reference voltage 621. In some embodiments, if the voltage level of supply voltage 115 is above control circuit reference voltage 621, comparator circuit 622 outputs a logic high value for comparator circuit enable signal 635. Conversely, if the voltage level of supply voltage 115 is below control circuit reference voltage 621, comparator circuit 622 outputs a logic low value for comparator circuit enable signal 635.

In some embodiments, control circuit reference voltage 621 can be set at a higher voltage level than the maximum ripple voltage of supply voltage 115 but below an over-voltage threshold level. The over-voltage threshold level is a voltage level at which devices electrically connected to supply voltage 115 breakdown or cease normal operation. By setting control circuit reference voltage 621 below the over-voltage threshold level, a rise in voltage at supply voltage 115 due to a load polarity change (e.g., a negative load current sunk into supply voltage 115) can be capped at control circuit reference voltage 621 while voltage regulator 210 is enabled, thus avoiding damage to devices electrically connected to supply voltage 115.

Referring to FIG. 6, in some embodiments, current source 630 is configured to: (1) draw current away from supply voltage 115 when voltage regulator 210 is disabled (or set in a high-Z state) and when supply voltage 115 is above a first predetermined voltage level (e.g., current source reference voltage 331; "a lower S2G threshold voltage level"); and (2) draw current away from supply voltage 115 when voltage regulator 210 is enabled and when supply voltage 115 is above a second predetermined voltage level (e.g., a current source reference voltage 631; "a higher S2G threshold voltage level"). With respect to operation (1), comparator circuit 330 and current source 330 operate in a similar manner as the same circuits in control circuit 230 of FIG. 3.

With respect to operation (2), comparator circuit 632 provides a current source enable signal 633 to current source 332. In some embodiments, comparator circuit 632 receives three inputs: comparator circuit enable signal 635, current source reference voltage 631, and supply voltage 115. In some embodiments, current source reference voltage 631 can be set to substantially the same voltage as control circuit reference voltage 621—e.g., a higher voltage level than the maximum ripple voltage of supply voltage 115 but below the over-voltage threshold level. Current source reference voltage 631 is also referred to herein as a "higher S2G threshold voltage level" since it is at a higher voltage level than current source reference voltage 331 ("a lower S2G threshold voltage level"), according to some embodiments.

As discussed above, when supply voltage 115 is above the current source reference voltage 631 (e.g., due to a rise in voltage at supply voltage 115 from a load polarity change while voltage regulator 210 is enabled), comparator circuit enable signal 635 is at a logic high value. In some embodiments, when comparator circuit enable signal 635 is at a logic high value, comparator circuit 632 is enabled. Conversely, when comparator circuit enable signal 635 is at a logic low value, comparator circuit 632 is disabled.

When comparator circuit 632 is enabled, if the voltage level of supply voltage 115 is above current source reference voltage 631 (e.g., the higher S2G threshold voltage level), comparator circuit 632 outputs a logic high value for current source enable signal 633. When current source enable signal 633 is at a logic high value, current source 332 is enabled and draws current away from the output node of voltage regulator 210, thus preventing supply voltage 115 to rise above current source reference voltage 631. Conversely, if the voltage level of supply voltage 115 is below current source reference voltage 631, comparator circuit 632 outputs a logic low value for current source enable signal 633, thus disabling current source 332.

In some embodiments, current source 332 can be a single current source enabled by comparator circuit 330 (e.g., comparing supply voltage 115 to the lower S2G threshold voltage level) and by comparator circuit 632 (e.g., comparing supply voltage 115 to the higher S2G threshold voltage level). In some embodiments, current source 332 can include multiple current sources that can be enabled by comparator circuit 330 and comparator circuit 632—e.g., one current source for comparator circuit 330 for the lower S2G threshold voltage level condition and one current source for comparator circuit 632 for the higher S2G threshold voltage level condition. Current source 332 can include one or more low dropout linear regulators or any other suitable types of current sources to draw current away from supply voltage 115.

Figure 7:
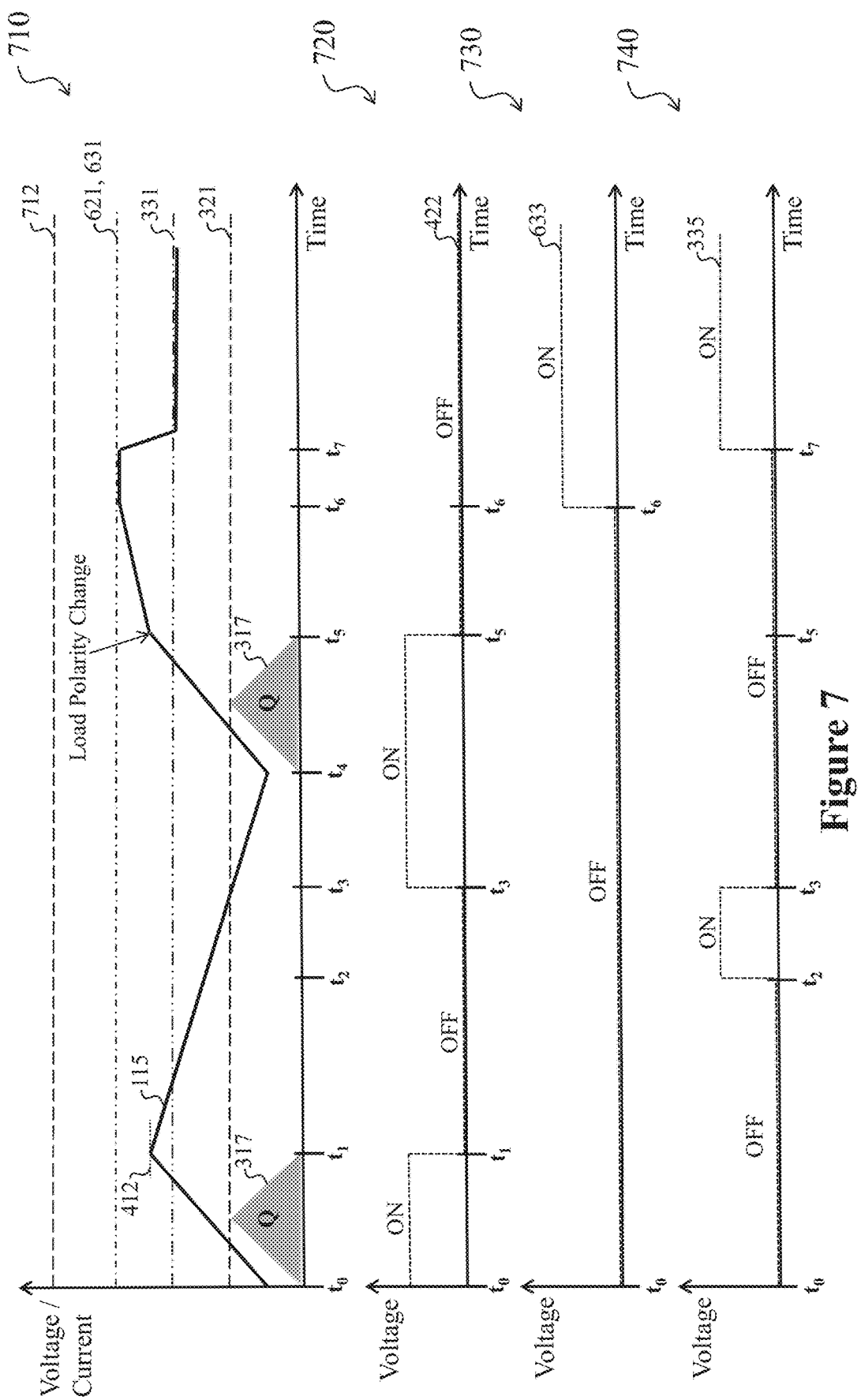
FIG. 7 is an illustration of waveforms showing an operation of the power management circuit of FIG. 6, according to some embodiments.

FIG. 7 is an illustration of waveforms 710, 720, 730, and 740 showing an operation of the power management circuit of FIG. 6, according to some embodiments. As discussed above, current source 630 of FIG. 6 is configured to: (1) draw current away from supply voltage 115 when voltage regulator 210 is disabled (or set in a high-Z state) and when supply voltage 115 is above a first predetermined voltage level (e.g., current source reference voltage 331; "a lower S2G threshold voltage level"); and (2) draw current away from supply voltage 115 when voltage regulator 210 is enabled and when supply voltage 115 is above a second predetermined voltage level (e.g., a current source reference voltage 631; "a higher S2G threshold voltage level").

Referring to FIG. 7, waveform 710 shows an example behavior of supply voltage 115 over time and an example behavior of current 317 over time. Waveform 720 shows an example behavior of comparator circuit output 422 over time. Waveform 730 shows an example behavior of current source enable signal 633 over time. And waveform 740 shows an example behavior of comparator circuit enable signal 335 over time. The curvatures in waveforms 710, 720, 730, and 740 are exemplary and for illustration purposes; these waveforms may include different curvatures.

For the time period time $t_0$ to time $t_5$, the description of waveforms 710, 720, 730, and 740 is similar to that of waveforms 410, 420, and 430 of FIG. 4 and waveforms 510, 520, and 530 of FIG. 5. Referring to FIG. 7, waveform 710 includes control circuit reference voltage 321, current source reference voltage 331, control circuit reference voltage 621, current source reference voltage 631, and over-voltage threshold level 712. As discussed above, in some embodiments, control circuit reference voltage 321 and current source reference voltage 331 can be set to the voltage regulator reference voltage and a S2G threshold voltage level (also referred to herein as a "lower S2G threshold voltage level"), respectively. In some embodiments, control circuit reference voltage 621 and current source reference voltage 631 can be set to the same voltage level, such as another S2G threshold voltage level (also referred to herein as a "higher S2G threshold voltage level"). As shown in waveform 410, current source reference voltage 331 (e.g., the lower S2G threshold voltage level) is below the maximum ripple voltage 412 of supply voltage 115 and control circuit reference voltage 621/current source reference voltage 631 (e.g., the higher S2G threshold voltage level) is above the maximum ripple voltage 412 of supply voltage 115. Further, as shown in waveform 410, control circuit reference voltage 621/current source reference voltage 631 is below over-voltage threshold level 712, which is a voltage level at which devices electrically connected to supply voltage 115 breakdown or cease normal operation. During the operation of voltage regulator 210, when supply voltage 115 falls below control circuit reference voltage 321 (e.g., the voltage regulator reference voltage)—e.g., due to current drawn by load circuit 240 of FIG. 3—comparator circuit output 422 is at a logic high value.

Referring to waveform 720, comparator circuit output 422 is at a logic high value during the following time periods: time period time $t_0$ to time $t_1$ and time period time $t_3$ to time $t_5$. Similar to the description above, in some embodiments, comparator circuit output 422 can transition from a logic low value to a logic high value when supply voltage 115 initially falls below control circuit reference voltage 321 (e.g., the voltage regulator reference voltage) and remain at the logic high value for a predetermined amount of time. For example, at time $t_3$, comparator circuit output 422 transitions from a logic low value to a logic high value due to supply voltage 115 falling below control circuit reference voltage 321 and remains at a logic high value for a predetermined amount of time—e.g., time period time $t_3$ to time $t_5$. During this time period (e.g., time period time $t_3$ to time $t_5$), voltage regulator 210 is enabled, in which controller 310 adjusts the switching frequency to turn on and off first transistor 312 and second transistor 314 to increase the voltage level of supply voltage 115 to or above control circuit reference voltage 321. For example, at time $t_4$, controller 310 provides pulses to turn on and off first transistor 312 and second transistor 314 at variable times—via signal line 313 and signal line 315 electrically connected to gate terminals of first transistor 312 and second transistor 314, respectively-based on the load required by load circuit 240.

During the time period when voltage regulator 210 is enabled (e.g., time period time $t_3$ to time $t_5$), a load polarity change occurs where a negative load current is sunk into supply voltage 115, causing supply voltage 115 to rise. At time $t_6$, supply voltage 115 rises to control circuit reference voltage 621/current source reference voltage 631 (e.g., the higher S2G threshold voltage level). As a result, referring to waveform 730, current source enable signal 633 transitions to a logic high value and enables current source 332. Current source 332 prevents supply voltage 115 from rising above control circuit reference voltage 621/current source reference voltage 631 (e.g., the higher S2G threshold voltage level), according to some embodiments.

Referring to waveform 740, at time $t_7$, comparator circuit enable signal 335 transitions from a logic low value to a logic high value at a delayed time after comparator circuit output 422 transitions from a logic high value to a logic low value, according to some embodiments. When comparator circuit output 422 is at a logic low value, voltage regulator 210 is disabled (or set in a high-Z state). The time at which comparator circuit enable signal 335 transitions to a logic high value—and thus enabling comparator circuit 330—is a delayed time after which voltage regulator 210 is disabled (or set in a high-Z state). Once comparator circuit enable signal 335 is at a logic high value, comparator circuit 330 compares supply voltage 115 to current source reference voltage 331 (e.g., the lower S2G threshold voltage level). If the voltage level of supply voltage 115 is above current source reference voltage 331, comparator circuit 330 outputs a logic high value for current source enable signal 333. In some embodiments, comparator circuit 330 adjusts a current level of current source 332 (via current source enable signal 333) based on a voltage level magnitude difference between supply voltage 115 and current source reference voltage 331. In turn, current source 332 is enabled and draws current away from the output node of voltage regulator 210, thus preventing supply voltage 115 to rise above current source reference voltage 331.

A benefit of enabling current source 332 during an enablement period of voltage regulator 210, among others, is to prevent supply voltage 115 from rising to over-voltage threshold level 712 due to a load polarity change. As a result, damage to devices electrically connected to supply voltage 115 can be prevented.

Figure 8:
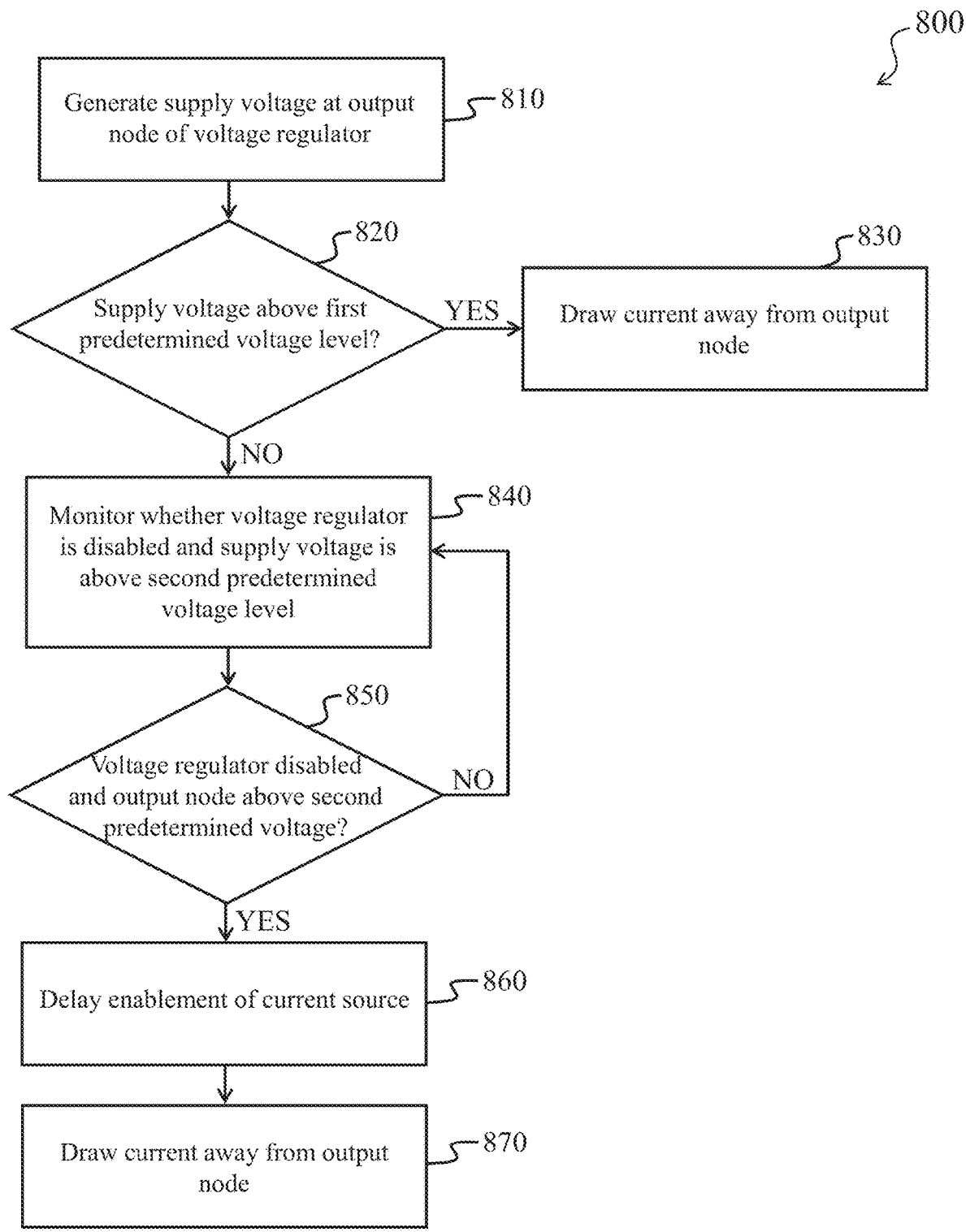
FIG. 8 is an illustration of a method for regulating an output load of a voltage regulator, according to some embodiments.

FIG. 8 is an illustration of a method 800 for regulating an output load of a voltage regulator, according to some embodiments. For illustrative purposes, the operations illustrated in method 800 will be described with reference to the circuit-level representation of power management circuit 110 shown in FIGS. 3 and 6. Other representations of power management circuit 110 are within the scope of the present disclosure. Also, additional operations may be performed between various operations of method 800 and may be omitted merely for clarity and ease of description. The additional operations can be provided before, during, and/or after method 800, in which one or more of these additional operations are briefly described herein. Moreover, not all operations may be needed to perform the disclosure provided herein. Additionally, some of the operations may be performed simultaneously or in a different order than shown in FIG. 8. In some embodiments, one or more other operations may be performed in addition to or in place of the presently-described operations.

At operation 810, a supply voltage is generated at an output node of a voltage regulator. Referring to FIGS. 3 and 6, voltage regulator 210 generates supply voltage 115 at an output node. In some embodiments, voltage regulator 210 can be a switched DC-DC voltage converter, such as a step-up voltage converter (e.g., a boost voltage converter), a step-down voltage converter (e.g., a buck voltage converter), or a step down/up voltage converter (e.g., a buck-boost voltage converter). The switched DC-DC converter can employ a PFM mode of operation, where a switching frequency of the switched DC-DC voltage converter can change as a function of a current consumed by load circuit 240.

Referring to FIG. 8, at operation 820, a determination is made whether the supply voltage is above a first predetermined voltage level. Referring to FIG. 6, comparator circuit 632 compares the voltage level of supply voltage 115 to current source reference voltage 631— e.g., the first predetermined voltage level. In some embodiments, current source reference voltage 631—e.g., the first predetermined voltage level or the higher S2G threshold voltage level—can be set to a higher voltage level than the maximum ripple voltage of supply voltage but below the over-voltage threshold level.

Referring to FIG. 8, at operation 830, if the supply voltage is above the first predetermined voltage level, then current is drawn away from the output node of the voltage regulator. Referring to FIG. 6, when comparator circuit 632 is enabled, if the voltage level of supply voltage 115 is above current source reference voltage 631 (e.g., the first predetermined voltage level or the higher S2G threshold voltage level), comparator circuit 632 outputs a logic high value for current source enable signal 633. When current source enable signal 633 is at a logic high value, current source 332 is enabled and draws current away from the output node of voltage regulator 210, thus preventing supply voltage 115 to rise above current source reference voltage 631.

At operation 840, if the supply voltage is not above the first predetermined voltage level, two occurrences are monitored: whether the voltage regulator is disabled (or set in a high-Z state) and whether the supply voltage is above a second predetermined voltage level. Referring to FIGS. 3 and 6, after supply voltage 115 reaches the desired output voltage of voltage regulator 210, voltage regulator 210 can be disabled (or set in a high-Z state)—e.g., no pulses are received by first transistor 312 and second transistor 314—until supply voltage 115 falls below the desired output voltage of voltage regulator 210. Further, in some embodiments, the second predetermined voltage level can be current source reference voltage 331 (e.g., the lower S2G threshold voltage level), which can be set at a voltage level below the maximum ripple voltage of supply voltage 115 when voltage regulator 210 is enabled.

Referring to FIG. 8, at operation 850, a determination is made whether the voltage regulator is disabled and whether the supply voltage is above the second predetermined voltage level. Referring to FIGS. 3 and 6, when voltage regulator 210 is disabled, the voltage level of supply voltage 115 can rise due to a load polarity change that sinks a negative load current into supply voltage 115. The voltage level of supply voltage 115 can rise to current source reference voltage 331 (e.g., the second predetermined voltage level or the lower S2G threshold voltage level). If voltage regulator 210 is not disabled or supply voltage 115 is not above current source reference voltage 331, then method 800 repeats operation 850.

Referring to FIG. 8, at operation 860, if the voltage regulator is disabled and the supply voltage is above the second predetermined voltage level, an enablement of a current source circuit is delayed. Referring to FIGS. 3 and 6, in some embodiments, delay circuit 324 is configured to delay the output from logic OR circuit 320 for a predetermined amount of time from when voltage regulator 210 is disabled or set in a high-Z state (e.g., a time period between time $t_6$ to time $t_8$, as discussed above with respect to FIG. 4). For example, the predetermined amount of time can be a time period from when voltage regulator 210 is disabled (or set in a high-Z state) to when voltage regulator 210 fully transfers charge to load circuit 240 (e.g., time period time $t_4$ to time $t_6$, as discussed above with respect to FIG. 4). Put differently, supply voltage 115 reaches its maximum ripple voltage (when voltage regulator 210 is enabled) prior to comparator circuit 330 (and current source 332) being enabled.

Referring to FIG. 8, at operation 870, current is drawn away from the output node of the voltage regulator. Referring to FIGS. 3 and 6, when comparator circuit 330 is enabled and if the voltage level of supply voltage 115 is above current source reference voltage 331 (e.g., the second predetermined voltage level or the lower S2G threshold voltage level), comparator circuit 330 outputs a logic high value for current source enable signal 333. When current source enable signal 333 is at a logic high value, current source 332 is enabled and draws current away from the output node of voltage regulator 210, thus preventing supply voltage 115 to rise above current source reference voltage 331 (e.g., the second predetermined voltage level or the lower S2G threshold voltage level).

Figure 9:
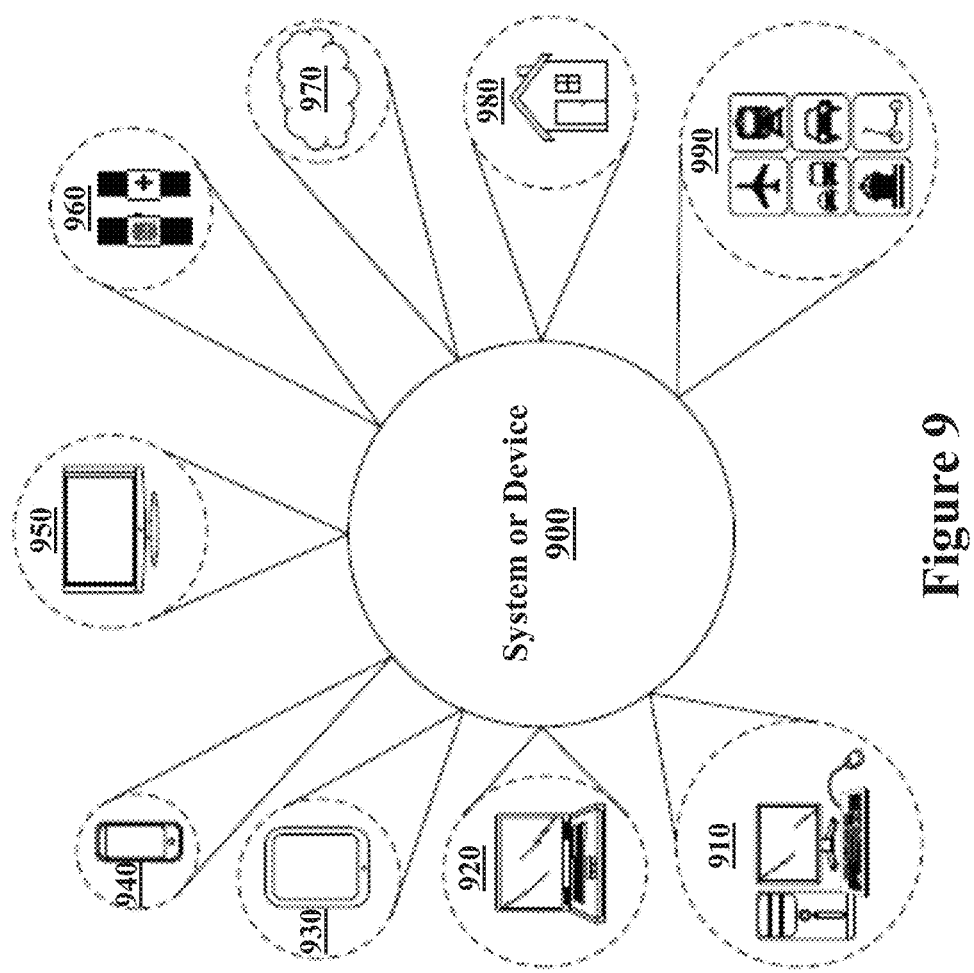
FIG. 9 is an illustration of various exemplary systems or devices that can include the disclosed embodiments.

FIG. 9 is an illustration of exemplary systems or devices that can include the disclosed embodiments. System or device 900 can incorporate one or more of the disclosed embodiments in a wide range of areas. For example, system or device 900 can be implemented in one or more of a desktop computer 910, a laptop computer 920, a tablet computer 930, a cellular or mobile phone 940, and a television 950 (or a set-top box in communication with a television).

Also, system or device 900 can be implemented in a wearable device 960, such as a smartwatch or a health-monitoring device. In some embodiments, the smartwatch can have different functions, such as access to email, cellular service, and calendar functions. Wearable device 960 can also perform health-monitoring functions, such as monitoring a user's vital signs and performing epidemiological functions (e.g., contact tracing and providing communication to an emergency medical service). Wearable device 960 can be worn on a user's neck, implantable in user's body, glasses or a helmet designed to provide computer-generated reality experiences (e.g., augmented and/or virtual reality), any other suitable wearable device, and combinations thereof.

Further, system or device 900 can be implemented in a server computer system, such as a dedicated server or on shared hardware that implements a cloud-based service 970. System or device 900 can be implemented in other electronic devices, such as a home electronic device 980 that includes a refrigerator, a thermostat, a security camera, and other suitable home electronic devices. The interconnection of such devices can be referred to as the "Internet of Things" (IoT). System or device 900 can also be implemented in various modes of transportation 990, such as part of a vehicle's control system, guidance system, and/or entertainment system.

The systems and devices illustrated in FIG. 9 are merely examples and are not intended to limit future applications of the disclosed embodiments. Other example systems and devices that can implement the disclosed embodiments include portable gaming devices, music players, data storage devices, and unmanned aerial vehicles.

It is to be appreciated that the Detailed Description section, and not the Abstract of the Disclosure section, is intended to be used to interpret the claims. The Abstract of the Disclosure section may set forth one or more but not all possible embodiments of the present disclosure as contemplated by the inventor(s), and thus, are not intended to limit the subjoined claims in any way.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

The foregoing disclosure outlines features of several embodiments so that those skilled in the art may better understand the aspects of the present disclosure. Those skilled in the art will appreciate that they may readily use the present disclosure as a basis for designing or modifying other processes and structures for carrying out the same purposes and/or achieving the same advantages of the embodiments introduced herein. Those skilled in the art will also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
   a voltage regulator comprising an output node and configured to provide a supply voltage at the output node;
   a current source circuit configured to draw a current away from the output node; and
   a control circuit configured to:
      detect a status of the voltage regulator;
      detect an output voltage at the output node; and
      adjust the current source circuit based on the detected status of the voltage regulator and the detected output at the output node.

2. The system of claim 1, wherein the control circuit is configured to delay enabling the current source circuit in response to detecting the voltage regulator being disabled and detecting the output voltage being above a predetermined voltage level.

3. The system of claim 1, wherein the voltage regulator comprises a step-up voltage converter, a step-down voltage converter, or a step up/down voltage converter.

4. The system of claim 1, wherein the voltage regulator is configured to provide the supply voltage with a maximum voltage level higher than the predetermined voltage level.

5. The system of claim 1, wherein the current source circuit comprises:
   a comparator circuit electrically connected to a reference voltage and to the output node, wherein the comparator circuit is configured to output an enable signal in response to the output voltage at the output node being higher than the reference voltage; and
   a current source configured to draw the current away from the output node in response to receiving the enable signal from the comparator circuit.

6. The system of claim 5, wherein:
   the comparator circuit is further configured to output a disable signal in response to the output voltage at the output node being lower than the reference voltage; and
   the current source is further configured to cease drawing the current away from the output node in response to receiving the disable signal from the comparator circuit.

7. The system of claim 5, wherein the current source comprises a low dropout linear regulator.

8. The system of claim 1, wherein the current source circuit is configured to draw the current away from the output node in response to a negative load being electrically connected to the output node and the ouput voltage at the output node being above a predetermined voltage level.

9. The system of claim 1, wherein the control circuit comprises:
   a comparator circuit electrically connected to a reference voltage and to the output node, wherein the comparator circuit is configured to output a first latch input signal in response to the voltage at the output node being higher than the reference voltage;
   a delay circuit electrically connected to the voltage regulator and configured to output a second latch input signal after a predetermined amount of time from when the voltage regulator is disabled; and
   a latch circuit configured to output an enable signal to the current source circuit in response to receiving the first and second latch input signals from the comparator circuit and the delay circuit, respectively.

10. The system of claim 1, wherein the control circuit is configured to delay enabling the current source circuit until a period of time after the supply voltage reaches a maximum voltage level when the voltage regulator is enabled.

11. A power supply system, comprising:
a switched DC-DC converter comprising an output node and configured to provide a power supply voltage at the output node;
a load circuit electrically connected to the output node;
a negative current regulator configured to draw a current away from the output node; and
a control circuit configured to delay enabling the negative current regulator in response to the switched DC-DC converter being disabled and a voltage at the output node being above a predetermined voltage level and, wherein the delayed enablement of the negative current regulator occurs after the power supply voltage reaches a maximum voltage level.

12. The power supply system of claim 11, wherein the switched DC-DC converter is configured to provide the power supply voltage with the maximum voltage level higher than the predetermined voltage level.

13. The power supply system of claim 11, wherein the negative current regulator is configured to draw the current away from the output node in response to the load circuit transitioning to a lower voltage level and the voltage at the output node being above the predetermined voltage level.

14. The power supply system of claim 11, wherein the negative current regulator is further configured to cease drawing the current away from the output node in response to the voltage at the output node being lower than the predetermined voltage level.

15. The power supply system of claim 11, wherein the control circuit is configured to delay enabling the negative current regulator until a period of time after the power supply voltage reaches the maximum voltage level when the switched DC-DC converter is enabled.

16. A method, comprising:
generating a supply voltage at an output node of a voltage regulator;
monitoring when the voltage regulator is disabled and a voltage at the output node is above a predetermined voltage level;
delaying enablement of a current source circuit in response to the voltage regulator being disabled and the voltage at the output node being above the predetermined voltage level; and
drawing, with the current source circuit, a current away from the output node in response to the current source circuit being enabled.

17. The method of claim 16, wherein generating the supply voltage comprises operating the voltage regulator in a Pulse Frequency Modulation mode of operation in response to a positive or negative load current at the output node.

18. The method of claim 16, wherein generating the supply voltage comprises generating the supply voltage with a maximum voltage level higher than the predetermined voltage level.

19. The method of claim 16, wherein delaying enablement of the current source circuit comprises generating an enable signal for the current source circuit after the supply voltage reaches a maximum voltage level.

20. The method of claim 16, wherein drawing the current away from the output node comprises drawing the current away from the output node in response to a load circuit electrically connected to the output node transitioning to a lower voltage level and the voltage at the output node being above the predetermined voltage level.

* * * * *